E. B. MEAD.
BORING MACHINE ATTACHMENT.
APPLICATION FILED AUG. 4, 1915.

1,345,455.

Patented July 6, 1920.
2 SHEETS—SHEET 1.

INVENTOR
Ezra B. Mead.
BY
Morsell, Keeney + French.
ATTORNEY

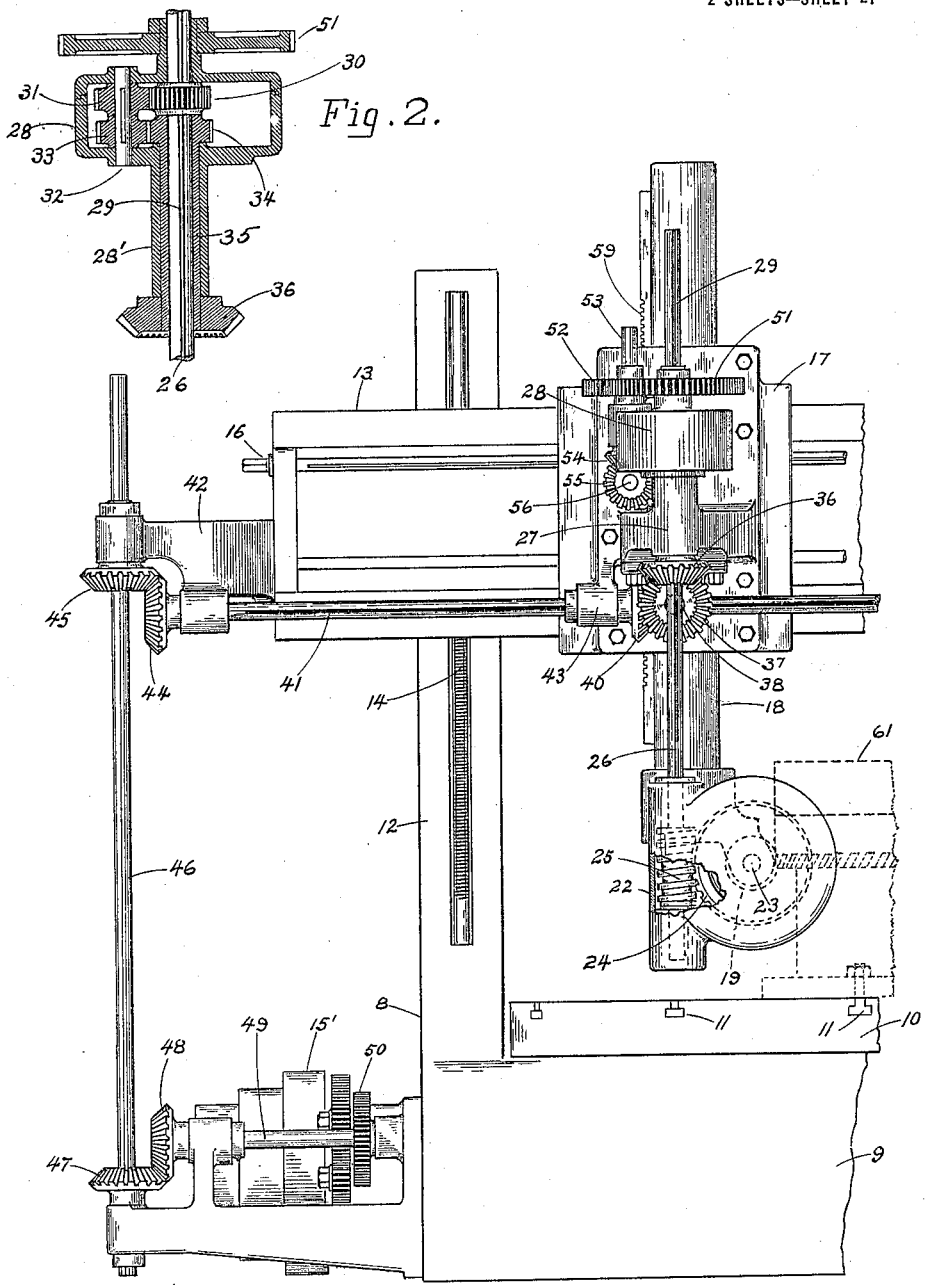

UNITED STATES PATENT OFFICE.

EZRA B. MEAD, OF OTTUMWA, IOWA.

BORING-MACHINE ATTACHMENT.

1,345,455. Specification of Letters Patent. Patented July 6, 1920.

Application filed August 4, 1915. Serial No. 43,512.

*To all whom it may concern:*

Be it known that I, EZRA B. MEAD, a citizen of the United States, and resident of Ottumwa, in the county of Wapello and State of Iowa, have invented new and useful Improvements in Boring-Machine Attachments, of which the following is a description, reference being had to the accompanying drawings, which are a part of this specification.

This invention relates to improvements in boring machine attachments.

In cutting herringbone gears of large diameters it is the usual custom to bore and face the gear blanks on boring machines or mills and then cut the teeth upon a gear cutter, the cutting of the teeth of each angle requiring a resetting of the blank. This manner of making the gears required the use of two large and expensive machines and the changing of the work from one machine to the other and the accurate mounting of the work upon the different machines. This last mentioned operation required considerable time and unless the blank is accurately mounted the teeth would not be cut concentric with relation to the bore or facing of the blank.

It is one of the objects of the present invention to overcome the before mentioned objections and provide a boring machine attachment more particularly adapted for cutting large herringbone gears which includes the turning, boring, and facing the blanks and the cutting of the teeth thereof without removing the blanks from the machine.

A further object of the invention is to provide a boring machine attachment which will perform the complete work without the necessity of resetting the work thus saving time and broadening the scope of work of the boring machine and also permitting more accurate work to be done.

A further object of the invention is to provide a boring machine attachment which is of comparatively simple construction, is strong and durable and is well adapted for the purpose desired.

With the above and other objects in view the invention consists of the improved boring machine attachment and its parts and combinations as set forth in the claims, and all equivalents thereof.

In the accompanying drawing in which the same reference characters indicate the same parts in all of the views:

Fig. 2 is a sectional detail view of the differential gear; and

Fig. 3 is a front view of a portion of the boring machine and the attachment.

Figure 1:
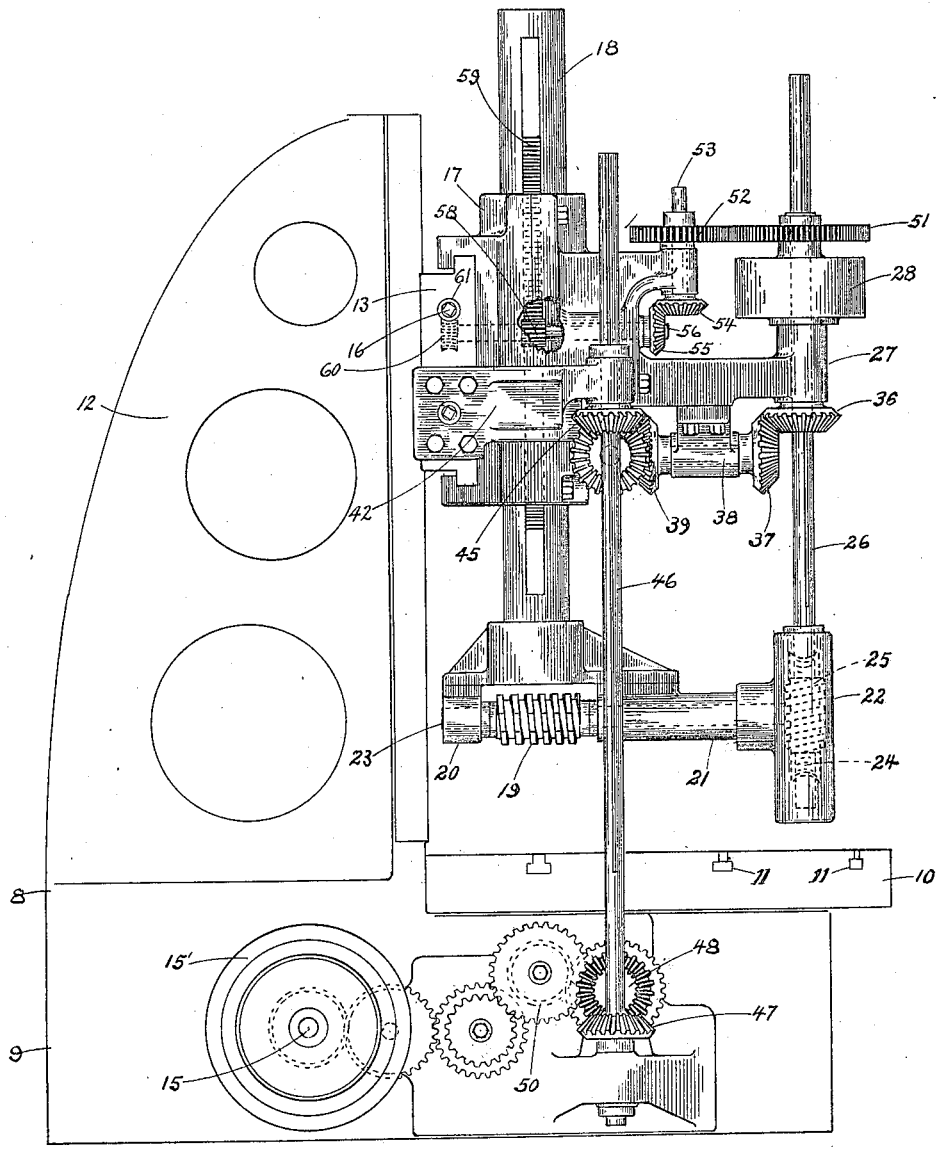
Figure 1 is a side view of a boring machine provided with the improved attachment.

Referring to the drawings the numeral 8 indicates a boring machine which comprises the bed frame 9, the revoluble table 10 provided with T-shaped slots 11, and the vertically extending guide standards 12 (only one being shown). The front faces of the standards adjustably carry a horizontally extending rail 13 which is adjusted vertically for height of work by screws 14. The screws and the table are revolved by a geared connection from the drive shaft 15 in the ordinary manner common to machines of this class.

The rail 13 is provided with a horizontally extending screw 16 which is adapted to adjust the ordinary tool carriage (not shown) usually provided with the boring machine. All of the parts thus far described are of ordinary construction and common to boring machines or mills.

A carriage or apron 17 horizontally slidably mounted on the rail 13 is provided with a vertically movable ram 18 which carries the gear cutting hob 19 journaled in its lower end. The lower end of the ram carries a casting or bearing head 20 in which the hob is journaled and said head has an outward tubular extension 21 provided with a gear bearing and casing 22 at its outer end. The hob shaft 23 upon which the cutting hob is mounted is journaled in the bearing head and extends through the tubular extension and into the casing 22 and at its outer end is provided with a worm wheel 24 which is in mesh with a worm 25 mounted upon a vertically extending shaft 26 also journaled in the casing 22. This last mentioned shaft slidably extends through and is journaled in a bearing bracket 27 projecting from the carriage 17. The bearing bracket 27 rotatably supports a differential gear case 28 through which the vertical shaft 26 slidably extends. This shaft is provided with a keyway 29 and a pinion 30 positioned within the casing and mounted on the shaft is slidably keyed thereto. The pinion is in mesh with another pinion 31 mounted on a short vertical shaft 32 also journaled in the casing. The short shaft is provided with another pinion 33 of less diameter which is in mesh with a sleeve pinion 34 loosely journaled on the vertical shaft 26. Pinions 31 and 33 are both keyed to the short shaft and rotate together.

The sleeve 35 of the sleeve pinion 34 extends downwardly therefrom and through the hub 28' of the casing 28 and at its lower end is provided with a beveled gear 36 which is in mesh with another beveled gear 37 mounted on the outer end of a short horizontal shaft 38 which is journaled in the bearing bracket 27. The inner end of the short horizontal shaft 38 is provided with a bevel gear 39 which is in mesh with a bevel gear 40 slidably keyed on a horizontal shaft 41 extending transversely across the machine in front of the carriage 17. This last mentioned shaft 41 is journaled in an arm 42 projecting from the end of the rail 13 and extends through the gear 40 which is journaled in an arm 43 projecting from the carriage. The outer end of the transverse shaft 41 is provided with a beveled gear 44 which meshes with a bevel gear 45 journaled in the rail arm 42 and slidably keyed to a vertically extending driving shaft 46. The lower end of this shaft 46 is journaled in the bed frame 9 and carries a bevel gear 47 which is in mesh with a similar gear 48 mounted on the outer end of a counter shaft 49. A train of gear 50 rotates the table 10 and connects the counter shaft to the drive shaft and the drive shaft is provided with cone pulleys 15' for connection with a source of power.

The upper end portion of the revoluble differential gear case 28 has mounted thereon a gear wheel 51 which is concentric with relation to the shaft 26 and meshes with a pinion 52 mounted on a short vertical shaft 53. The said short shaft is journaled in an arm projecting from the carriage 17 and at its lower end is provided with a bevel pinion 54 which is in mesh with a similar pinion 55 mounted on the outer end of a horizontally extending feed shaft 56. This feed shaft carries a feed pinion 58 which meshes with rack teeth 59 formed on the ram 18 and also carries a worm wheel 60 engaged by the feed screw 16 of the rail 13. By changing the ratio of the gears 51 and 52 the hob may be rotated at any speed desired with relation to the speed of rotation of the table 10.

A portion of a herringbone gear 61, indicated by dotted lines, is shown clamped to the revoluble table and in the process of having the teeth cut thereon.

While the drawings only show the attachment and only approximately one-half of the boring machine or mill it is to be understood that the modern boring mill is provided with two carriages and rams and the necessary mechanism for operating same, and that the improved attachment is substituted for one of the carriages and rams so that the remaining parts of the mill may perform their functions in the ordinary well known manner.

In operation the herringbone gear casting is clamped in position on the revoluble table and one side is faced off by revolving the table and the casting mounted thereon, the casting engaging a cutting tool held by the ram of the boring mill. If there are any flanges for fitting and bolting the casting to a drum, etc., the side with said fitting flanges is not finished until after the casting has been bored, turned and the teeth cut at one setting. After casting is faced and bored it is engaged by the improved attachment and the teeth are then cut with the ram of said attachment. In cutting the teeth the lower half of the teeth are preferably, although not necessarily, cut first, allowing the top of the cut to extend above the center line of the gear for a distance equal to one-half of the circular pitch of the teeth. The rotation of the gear casting is then stopped and a line is then drawn by the opposite ram from the edge of the tooth at the bottom face straight up to the top face thus giving a point to measure from in starting the hob cutter for the top half of the teeth and the same operation is repeated by cutting downwardly to an equal distance below the center line of the gear as before mentioned. As all cut herringbone gears cut by the hob process have a central space between the inner ends of the angularly disposed teeth which is inactive and which is equal to the circular pitch, this central cross cutting of the inner ends of the teeth forms said space. In cutting the lower teeth the table is revolved at the desired speed with relation to the upward feed and rotation of the hob cutter to give the desired angle to the teeth, and in cutting the upper teeth an opposite hand hob cutter is substituted and is rotated in the same direction as the first mentioned hob but the table is revolved in the opposite direction by inserting an added gear in the train of gears (not shown) revolving the table in a manner common to boring mills.

In case the hob cutter is not in proper position to start the cut of the upper teeth with relation to the vertical guide line the differential may be disengaged and by turning it by hand the hob cutter may be revolved to start the teeth at the desired point with reference to the vertical guide line.

From the foregoing description it will be seen that the boring machine attachment is well adapted for the purpose desired.

What I claim as my invention is:

1. The combination with a boring machine having a revoluble table and a horizontally extending rail and adapted to turn, bore and face gear blanks; of an attachment therefor for cutting the teeth of the gear blanks without removing or resetting the blanks comprising a carriage slidably mounted on the rail, a vertically movable ram connected to the carriage, a hob cutter carried by the ram, and a driving connection between the hob cutter and the boring machine for rotating and moving the hob vertically at a rate of speed bearing a certain relation to the speed of rotation of the table.

2. The combination with a boring machine having a revoluble table and a horizontally extending rail and actuating means for said parts and adapted to turn, bore and face gear blanks, of an attachment therefor for cutting the teeth of the gear blanks without removing or resetting the blanks comprising a carriage horizontally slidably mounted on the rail, a vertically movable ram mounted on the carriage, a hob cutter carried by the ram, a transmission means connecting the hob cutter and the ram to the actuating means and including a differential gear, said transmission means serving to move the hob vertically at a rate of speed bearing a certain relation to the speed of rotation of the table.

3. The combination with a boring machine having a revoluble table and a horizontally extending rail and actuating means for said parts, and adapted to turn, bore and face gear blanks, of an attachment therefor cutting the teeth of the gear blanks without removing or resetting the blanks comprising a carriage horizontally slidably mounted on the rail, a vertically movable ram mounted on the carriage, a hob cutter revolubly carried by the lower portion of the ram, a worm wheel drive for the hob cutter including a vertically extending shaft, a driving connection between the vertical shaft and the actuating means, and a gear connection between the vertical shaft and the ram for moving said ram vertically at a rate of speed bearing a certain relation to the speed of rotation of the table.

4. The combination with a boring machine having a revoluble table and a horizontally extending rail and actuating means for said parts and adapted to turn, bore and face gear blanks, of an attachment therefor cutting the teeth of the gear blanks without removing or resetting the blanks, comprising a carriage horizontally slidably mounted on the rail, a vertically movable ram mounted on the carriage, a hob cutter revolubly carried by the lower portion of the ram, a worm wheel drive for the hob cutter including a vertically extending shaft, a driving connection between the vertical shaft and the actuating means, a differential gear mounted on the vertical shaft, and a gear connection between the differential gear and the ram, said gear connections moving the hob vertically at a rate of speed bearing a certain relation to the speed of rotation of the table.

5. The combination with a boring machine having a revoluble table and a horizontally extending and vertically adjustable rail and actuating means for said parts and adapted to turn, bore and face gear blanks, of an attachment therefor cutting the teeth of the gear blanks without removing or resetting the blanks, comprising a carriage horizontally slidably mounted on the rail, a vertically movable ram mounted on the carriage and having a bearing at its lower end, a horizontal shaft journaled in said bearing and having a worm wheel mounted on its outer end, a hob cutter mounted on the inner end portion of said shaft, a vertical worm shaft carried by the carriage and extending to a position adjacent to the worm wheel and having a worm in engagement therewith, a vertical drive shaft journaled in the boring machine frame and slidably and rotatably connected to the rail, a geared and slidable connection between both vertical shafts, a differential gear mounted on the vertical worm shaft, a geared connection between the differential gear and the ram, and a geared connection between the vertical drive shaft and the actuating means of the boring machine, said geared connections moving the hob cutter vertically at a rate of speed having a certain relation to the speed of rotation of the table and the hob cutter.

6. The combination with a boring machine having a revoluble table and a horizontally extending and vertically adjustable rail and actuating means for said parts and adapted to turn, bore and face gear blanks, of an attachment therefor for cutting the teeth of the gear blanks without removing or resetting the blanks comprising a carriage horizontally slidably mounted on the rail, a vertically movable ram mounted on the carriage and having a bearing at its lower end, a horizontal shaft journaled in said bearing and having a worm wheel mounted on its outer end, a hob cutter mounted on the inner end portion of said shaft, a vertical worm shaft carried by the carriage and extending to a position adjacent to the worm wheel and having a worm in engagement therewith, a vertical drive shaft journaled in the boring machine frame and slidably and rotatably connected to the rail, a horizontal shaft journaled in opposite end portions of the rail and having a bevel gear and slidable connection with the vertical drive shaft, meshed beveled gears slidably keyed to the horizontal shaft and to the vertical worm shaft, a differential gear mounted on the vertical worm shaft, a geared connection between the differential gear and the ram, and a geared connection between the vertical drive shaft and the actuating means of the boring machine, said geared connections moving the hob cutter vertically at a rate of speed bearing a certain relation to the speed of rotation of the table and the hob cutter.

7. The combination with a boring machine having a revoluble table and a horizontally extending and vertically adjustable rail and actuating means for said parts and adapted to turn, bore and face gear blanks, of an attachment therefor for cutting the teeth of the gear blanks without removing or resetting the blanks comprising a carriage horizontally slidably mounted on the rail, a vertically movable ram slidably extending through the carriage and having a bifurcated bearing at its lower end and rack teeth on its side, a shaft journaled in said bearing and having a worm wheel mounted on its outer end, a hob cutter mounted on the shaft between the bifurcated portions of the bearing, a vertical worm shaft carried by the carriage and extending to a position adjacent to the worm wheel and having a worm in engagement therewith, a beveled gear journaled in the carriage and through which gear the worm shaft slidably extends and to which it is keyed, a short shaft carried by the carriage and having beveled gears mounted on its opposite ends, one of said gears being in mesh with the worm shaft bevel gear, a vertical drive shaft journaled in the boring machine frame and slidably and rotatably connected to the rail, a bevel gear journaled in a part of the rail and through which gear the drive shaft slidably extends and to which it is keyed, a horizontal shaft journaled in the opposite end portions of the rail and having a bevel gear on one of its ends which is in mesh with the bevel gear of the drive shaft, a bevel gear carried by the carriage and in mesh with the bevel gear on one of the ends of the short shaft, said horizontal rail shaft slidably extending through the carriage gear and being keyed thereto, a gear connection between the driving shaft and the actuating mechanism of the boring machine, and a gear connection between the worm shaft and the rack teeth of the ram.

8. The combination with a boring machine having a revoluble table and a horizontally extending and vertically adjustable rail and actuating means for said parts and adapted to turn, bore and face gear blanks, of an attachment therefor for cutting the teeth of the gear blanks without removing or resetting the blanks comprising a carriage horizontally slidably mounted on the rail, a vertically movable ram slidably extending through the carriage and having a bifurcated bearing at it lower end and rack teeth on its side, a shaft journaled in said bearing and having a worm wheel mounted on its outer end, a hob cutter mounted on the shaft between the bifurcated portion of the bearing, a vertical worm shaft carried by the carriage and extending to a position adjacent to the worm wheel and having a worm in engagement therewith, a beveled gear journaled in the carriage and through which gear the worm shaft slidably extends and to which it is keyed, a short shaft carried by the carriage and having beveled gears mounted on its opposite ends, one of said gears being in mesh with the worm shaft bevel gear, a vertical drive shaft journaled in the boring machine frame and slidably and rotatably connected to the rail, a bevel gear journaled in a part of the rail and through which gear the drive shaft slidably extends and to which it is keyed, a horizontal shaft journaled in the opposite end portions of the rail and having a bevel gear on one of its ends which is in mesh with the bevel gear of the drive shaft, a bevel gear carried by the carriage and in mesh with the bevel gear on one of the ends of the short shaft, said horizontal rail shaft slidably extending through the carriage gear and being keyed thereto, a differential gear mounted on the vertical worm shaft, a short vertical shaft carried by the carriage, a geared connection between said vertical short shaft and the differential gear, a horizontally extending ram shaft having a geared connection with the short vertical shaft and the rack teeth of the ram, and a gear connection between the driving shaft and the actuating mechanism of the boring machine.

In testimony whereof I affix my signature, in presence of two witnesses.

EZRA B. MEAD.

Witnesses:
C. T. RAUSCHER,
H. M. FAGAN.